(12) United States Patent
Krieg

(10) Patent No.: US 12,345,319 B2
(45) Date of Patent: Jul. 1, 2025

(54) CROWN WHEEL GEAR

(71) Applicant: LEWA GMBH, Leonberg (DE)

(72) Inventor: Harald Krieg, Aalen (DE)

(73) Assignee: LEWA GMBH, Leonberg (DE)

( * ) Notice: Subject to any disclaimer, the term of this patent is extended or adjusted under 35 U.S.C. 154(b) by 0 days.

(21) Appl. No.: 18/686,135

(22) PCT Filed: Aug. 8, 2022

(86) PCT No.: PCT/EP2022/072187
§ 371 (c)(1),
(2) Date: Apr. 1, 2024

(87) PCT Pub. No.: WO2023/025579
PCT Pub. Date: Mar. 2, 2023

(65) Prior Publication Data
US 2025/0109785 A1    Apr. 3, 2025

(30) Foreign Application Priority Data
Aug. 25, 2021   (DE) .......................... 202021104559.0

(51) Int. Cl.
*F16H 57/022* (2012.01)
*F16H 1/12* (2006.01)

(52) U.S. Cl.
CPC .............. *F16H 57/022* (2013.01); *F16H 1/12* (2013.01); *F16H 2057/0222* (2013.01)

(58) Field of Classification Search
CPC .. F16H 57/022; F16H 1/12; F16H 2057/0222; F16H 2055/173
See application file for complete search history.

(56) References Cited

U.S. PATENT DOCUMENTS

2018/0073627 A1\*  3/2018  Gibbs ................... F16H 57/039
2020/0200251 A1   6/2020  Roussel et al.

FOREIGN PATENT DOCUMENTS

WO      2013067565 A1    5/2013

\* cited by examiner

*Primary Examiner* — Terence Boes
(74) *Attorney, Agent, or Firm* — DeLio Peterson & Curcio LLC; Robert Curcio

(57) ABSTRACT

The invention relates to a crown wheel gear, having a housing, a pinion shaft rotatably mounted relative to the housing, a pinion connected to the pinion shaft, a crown wheel shaft rotatably mounted relative to the housing, and a crown wheel connected to the crown wheel shaft, wherein the pinion and the crown wheel are in toothed engagement with one another. In this case, the crown wheel and the crown wheel shaft are arranged rotatably but fixed in position relative to the housing. The pinion is displaceable relative to the crown wheel in order to adjust a pivoting flank play between the crown wheel and the pinion.

15 Claims, 4 Drawing Sheets

CROWN WHEEL GEAR

BACKGROUND OF THE INVENTION

1. Field of the Invention

The invention relates to a crown wheel gear, which can be an integral part of crank drives for oscillating displacement pumps. The crown wheel gear having a housing, a pinion shaft rotatably mounted relative to the housing, a pinion connected to the pinion shaft, a crown wheel shaft rotatably mounted relative to the housing, and a crown wheel connected to the crown wheel shaft, wherein the pinion and the crown wheel are in toothed engagement with one another.

2. Description of Related Art

The crown wheel gear is a gear in which a pinion interacts with a crown wheel. The pinion, without influence on the tooth play, can be moved in the axial direction of the pinion freely over the crown wheel teeth. The toothed engagement between the pinion and the crown wheel is to be designed so that the pinion and the crown wheel mesh optimally. A defined flank play, which is required and favorable for the running, has to be ensured between the teeth of pinion and crown wheel. Due to unavoidable deviations in the production, a constant play is not present between the flanks of the teeth because of production. To avoid jamming of the teeth, a certain flank play is necessary. In principle, a distinction is made in the flank plays between the normal flank play, the radial play, and the pivoting flank play.

Crown wheel gears can be an integral part of crank drives for oscillating displacement pumps. The crown wheel shaft can either be designed as an eccentric shaft or can be connected to an eccentric. The rotational movement is converted into an oscillating movement via a connecting rod engaged with the eccentric.

For crown wheel gears it is necessary in particular, depending on the manufacturing tolerances, to adjust the so-called pivoting flank play in the toothed engagement between the pinion and the crown wheel. The pivoting flank play is the play in relation to the pitch circle here. The pivoting flank play is the length of the pitch circle arc around which the pinion and the crown wheel may be pivoted relative to one another. The pivoting flank play is influenced here by the thickness, the spacing, and the shape of the individual teeth on pinion and crown wheel and the relative spacing of pinion and crown wheel in relation to one another.

FIG. 1 shows a crown wheel gear 1 according to the prior art. The crown wheel gear 1 has a housing 2, a pinion shaft 3 mounted rotatably relative to the housing 2, a pinion 4 connected to the pinion shaft 3, a crown wheel shaft 5 rotatably mounted relative to the housing 2, and a crown wheel 6 connected to the crown wheel shaft 5. The pinion 4 and the crown wheel 6 are in toothed engagement 7 with one another. The pinion shaft 3 and the pinion 4 are mounted rotatably but fixed in position relative to the housing 2. The crown wheel shaft 5 is also mounted rotatably but fixed in position relative to the housing 2. In order to adjust the pivoting flank play between the crown wheel 6 and the pinion 4, only the crown wheel 6 is displaced in the direction of the crown wheel shaft axis 8. The possible displacement is shown by means of the arrows 9. The adjustment of the pivoting flank play requires a high installation effort here if shim rings between crown wheel shaft 5 and crown wheel 6 are used for the adjustment. Furthermore, the implementation of a shaft-hub connection displaceable axially in the direction of the crown wheel shaft axis 8 between the crown wheel 6 and the crown wheel shaft 5 requires a high level of design effort.

FIG. 2 shows a further crown wheel gear 1 according to the prior art. In the crown wheel gear of FIG. 2, the crown wheel 6, the crown wheel shaft 5, and the bearing 10 of the crown wheel shaft 5 are displaced to adjust the pivoting flank play between the crown wheel 6 and the pinion 4. A high level of design effort results. It is to be noted that the crown wheel shaft 5 is displaced relative to the housing 2. This can be unfavorable since the guidance of connecting rods and/or, for example, sealing points are to be designed for this displacement.

Document WO 2013/067565 A1 relates to a gear for a vehicle operated by muscle power having an auxiliary motor, in particular a pedelec, having a housing installable on the vehicle and a first drive shaft mounted therein for feeding and muscle power, which acts on an approximately coaxial output shaft to drive the vehicle, and approximately at a right angle thereto a second driveshaft for connecting the auxiliary motor, which also acts via an angle gear on the output shaft, wherein the output shaft is a hollow shaft which is penetrated by the first driveshaft and is coupled thereto via a first freewheel. The second driveshaft has a pinion and the output shaft has a crown wheel which together form an angle gear in the form of a crown wheel gear. To adjust the play between pinion and crown wheel, a single-axis movement takes place, for example, of the crown wheel 21 in its axial direction.

Document US 2020/0200251 A1 describes a positioning drive for a component of a land motor vehicle having an actuator housing, which delimits an inner volume in which at least one electric motor and an internal mechanical gear is arranged. The mechanical gear has at least one first gear wheel, which has an axis of rotation, wherein the axis of rotation is perpendicular to the axis of rotation of the driveshaft of the actuated shaft. The first gear wheel has axial teeth, which are formed from teeth which have an extension from the bottom to the top in the direction of the axis of rotation of the first gear wheel and which mesh with a drive pinion of the electric motor.

SUMMARY OF THE INVENTION

Bearing in mind the problems and deficiencies of the prior art, it is therefore an object of the present invention to provide an improved crown wheel gear.

It is another object of the present invention to provide a crown gear achieved by the subject matter of the independent claims. Advantageous embodiments of the crown wheel gear according to the invention are the subject matter of the dependent claims and result from the following description of the invention.

The above and other objects, which will be apparent to those skilled in the art, are achieved in the present invention which is directed to a crown wheel gear comprising: a housing; a pinion shaft rotatably mounted relative to the housing; a pinion connected to the pinion shaft; a crown wheel shaft rotatably mounted relative to the housing; and a crown wheel connected to the crown wheel shaft; wherein the pinion and the crown wheel are in toothed engagement with one another, and wherein the crown wheel shaft has a crown wheel shaft axis; the crown wheel and the crown wheel shaft being arranged rotatably but fixed in position relative to the housing, and the pinion being displaceable relative to the crown wheel in order to adjust a pivoting flank play between the crown wheel and the pinion; wherein the pinion is displaceable parallel to the crown wheel shaft axis, wherein the pinion shaft is rotatably mounted in a flange and the flange is arranged displaceably in relation to the housing, and wherein at least one longitudinal fit arranged parallel to the crown wheel shaft axis is arranged between the housing and the flange in order to align the pinion shaft.

The pinion shaft includes a pinion shaft axis, and the pinion shaft and the crown wheel shaft are mounted to the housing such that the pinion shaft axis is arranged perpendicular to the crown wheel shaft axis.

The contact area of the flange and a contact area of the housing are designed so that the flange and the housing are connectable via a friction-locked connection or a partially formfitting connection.

The longitudinal fit has a groove in the housing, a groove in the flange, and a feather key arranged in both grooves.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
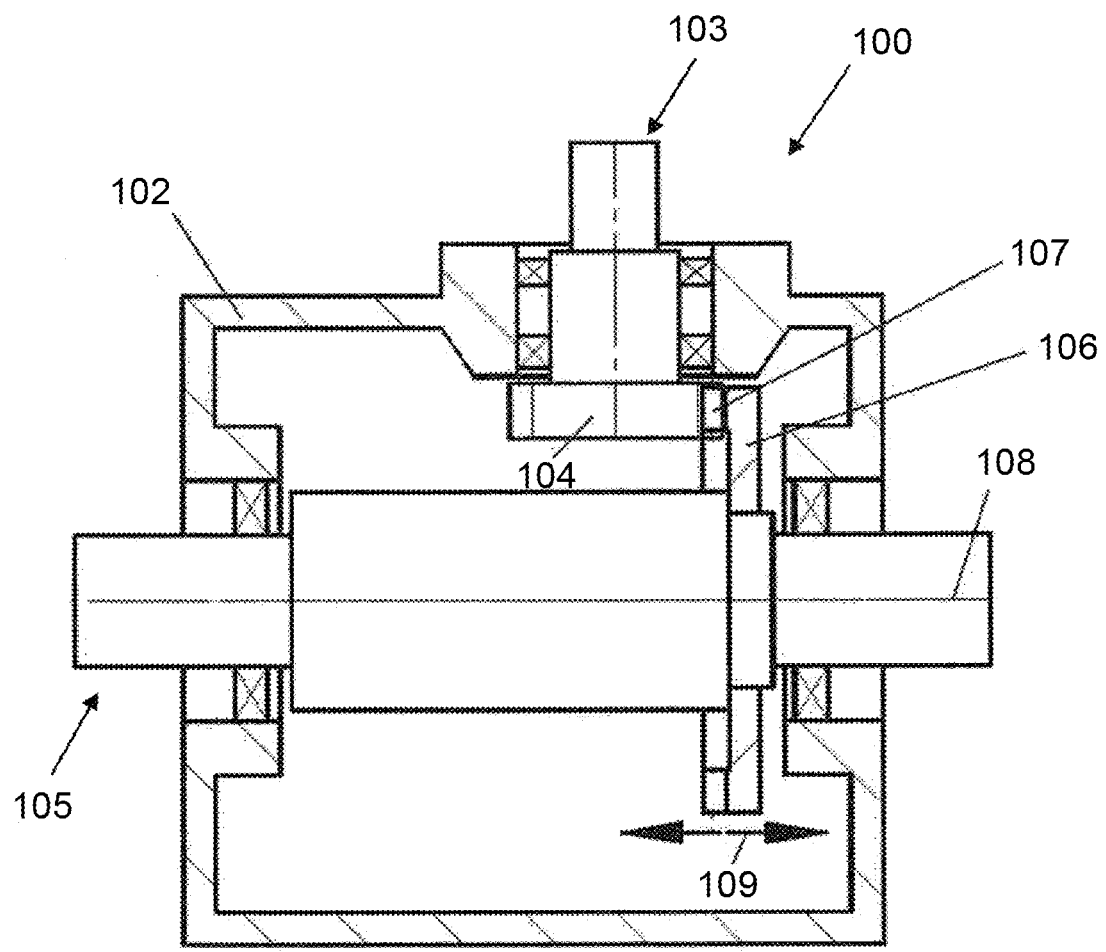
FIG. 1 shows a schematic sectional view of a crown wheel gear according to the prior art.
Figure 2:
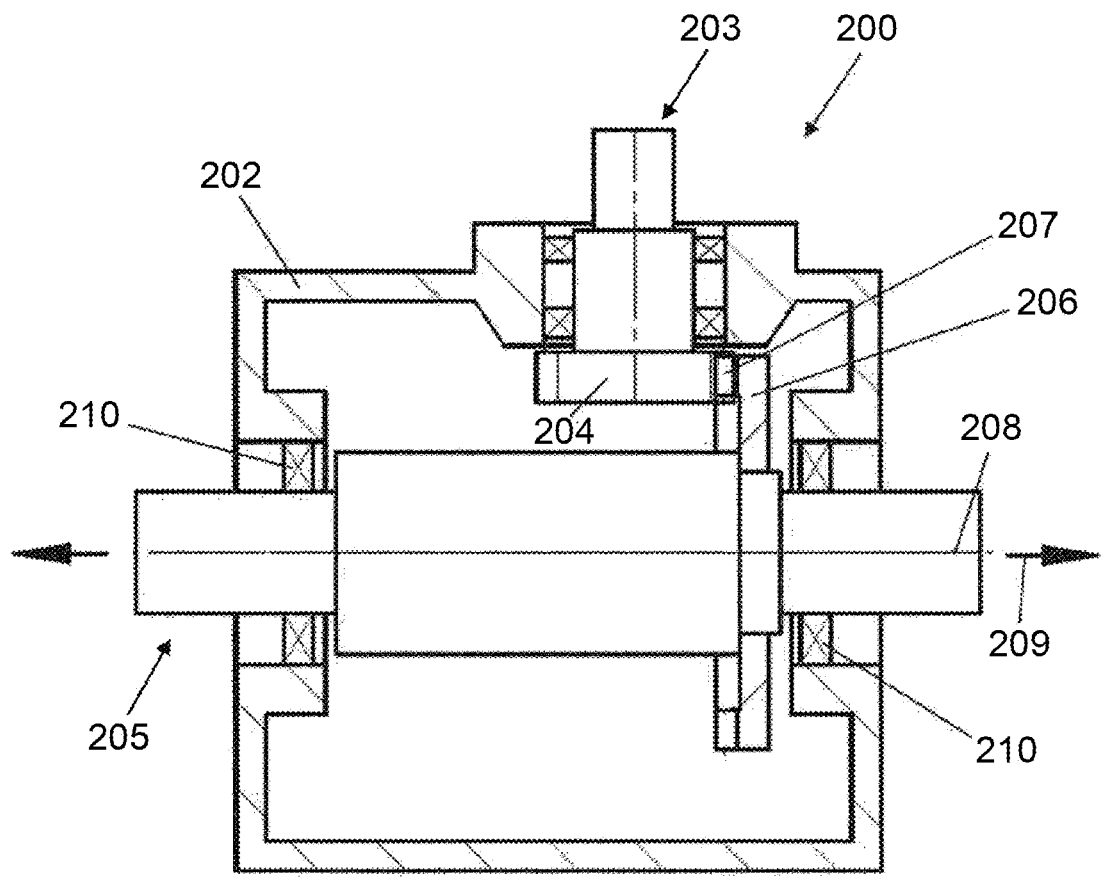
FIG. 2 shows a schematic sectional view of a further crown wheel gear according to the prior art.

In describing the preferred embodiment of the present invention, reference will be made herein to FIGS. 1-6 of the drawings in which like numerals refer to like features of the invention.

A crown wheel gear according to the invention is provided. The crown wheel gear has a housing, a pinion shaft rotatably mounted relative to the housing, a pinion connected to the pinion shaft, a crown wheel shaft rotatably mounted relative to the housing, and a crown wheel connected to the crown wheel shaft. The pinion and the crown wheel are in toothed engagement with one another. Furthermore, the crown wheel and the crown wheel shaft are arranged rotatably but fixed in position relative to the housing and the pinion is displaceable relative to the crown wheel in order to adjust a pivoting flank play between the crown wheel and the pinion.

Because the pinion is displaceable relative to the crown wheel, in spite of the crown wheel fixed in position, the pivoting flank play between the crown wheel and the pinion can be adjusted. The crown wheel arranged fixed in position relative to the housing has the advantage that the installation of the crown wheel and crown wheel shaft is simple. Moreover, the structural design of the crown wheel and crown wheel shaft can be simple. It is not necessary to displace further elements such as connecting rods or sealing points, and this does not have to be taken into consideration in the design. It is also not necessary to displace a bearing of the crown wheel shaft.

The fact that the pinion shaft is rotatably mounted relative to the housing means that the pinion shaft can rotate around its pinion shaft axis, but is directly or indirectly mounted by means of the housing. In particular, the pinion shaft is mounted via a bearing arranged between the pinion shaft and the housing. Because the pinion is connected to the pinion shaft, the pinion can also rotate relative to the housing around the pinion shaft axis.

The fact that the crown wheel shaft is mounted relative to the housing means that the crown wheel shaft can rotate around its crown wheel shaft axis, but is directly or indirectly mounted by means of the housing. In particular, the crown wheel shaft is mounted via a bearing arranged between the crown wheel shaft and housing. Because the crown wheel is connected to the crown wheel shaft, the crown wheel can also rotate around the crown wheel shaft axis relative to the housing.

The toothed engagement is to be understood as the intermeshing of the teeth of the pinion and the teeth of the crown wheel. The pivoting flank play can be influenced, as described above, via the spacing of the pinion from the crown wheel. Therefore, the pivoting flank play can be adjusted via the displacement of the pinion relative to the crown wheel.

According to one embodiment of the crown wheel gear, the crown wheel shaft has a crown wheel shaft axis. Furthermore, the pinion is displaceable parallel to the ground wheel shaft axis. A good toothed engagement can then also advantageously be achieved after the displacement of the pinion, i.e., a large area is achieved with which the teeth of pinion and crown wheel overlap.

According to a further embodiment of the crown wheel gear, the pinion shaft has a pinion shaft axis. Furthermore, the pinion shaft and the crown wheel shaft are mounted by means of the housing such that the pinion shaft axis is arranged perpendicular to the crown wheel shaft axis. A good toothed engagement can also be achieved by the arrangement having perpendicular axes, i.e., a large area is achieved with which the teeth of pinion and crown wheel overlap.

For example, the pinion shaft is mounted in the flange by means of a roller bearing or by means of a plain bearing. The flange is detachably connected to the housing. The detached flange can be displaced relative to the housing. The flange displaced into the desired position relative to the housing can be detachably fastened again after the displacement. The flange is exchangeable in principle. A matching flange can thus be selected for a first rough adjustment of the pinion relative to the crown wheel. The fine adjustment can be achieved by the displacement of the flange.

According to a further embodiment of the crown wheel gear, the flange is connectable to the housing by means of compression screws and/or lag screws. The detachable connection of the flange to the housing can be achieved by means of lag screws and by means of compression screws. The compression screws or lag screws are supported directly or indirectly on the housing here.

In the case of the lag screws, the lag screw can slide freely in the flange, i.e., in the area of the screw close to the head. In the case of screws having a continuous thread, a sliding hole is drilled into the flange, which corresponds to at least the external diameter of the screw. Screws which have a smooth area in the area close to the head automatically slide in the flange.

The compression screws can be used in a housing having an undercut in which the flange engages. Rotating the compression screw in the flange then causes a pressure of the compression screw from the outside on the housing so that the flange clamps the housing with the part located in the undercut and with the compression screw. The flange is thus detachably fastened on the housing.

According to a further embodiment of the crown wheel gear, a contact area of the flange and a contact area of the housing are designed so that the flange and the housing are connectable via a friction-locked connection. Because the friction-locked connection is detachable, the flange can be readjusted using the pinion shaft and the pinion and fastened again after the readjustment.

According to a further embodiment of the crown wheel gear, a contact area of the flange and a contact area of the housing are designed so that the flange and the housing are connectable via a partially formfitting connection. The partially formfitting connection is advantageously also detachable.

According to a further embodiment of the crown wheel gear, the contact area of the flange and/or the contact area of the housing has a jagged shape or a wavy shape. If the contact area of the flange and the contact area of the housing have a jagged shape or wavy shape matching with one another, the contact area of the flange in the contact area of the housing can intermesh. Accordingly, a partially formfitting connection is formed between the contact area of the flange and the contact area of the housing.

According to a further embodiment of the crown wheel gear, at least one longitudinal fit arranged parallel to the crown wheel shaft axis is arranged in order to align the pinion shaft. The pinion shaft can be adjusted by means of the longitudinal fit. The pinion shaft axis can thus be aligned relative to the crown wheel shaft axis.

According to a further embodiment of the crown wheel gear, the longitudinal fit has a groove in the housing, a groove in the flange, and a feather key arranged in both grooves. The longitudinal fit can be formed simply by means of the two grooves and the feather key.

Further possible implementations of the invention also comprise combinations of features described above or hereinafter which are not explicitly mentioned. Individual aspects can also be added as improvements or supplements to the respective basic form of the invention.

In the figures, identical or functionally-identical elements have been provided with the same reference signs. Furthermore, it is to be noted that the illustrations in the figures are not necessarily to scale. In FIGS. 1 to 4, which show a sectional view, the shading symbolizing a section is sometimes omitted.

Figure 3:
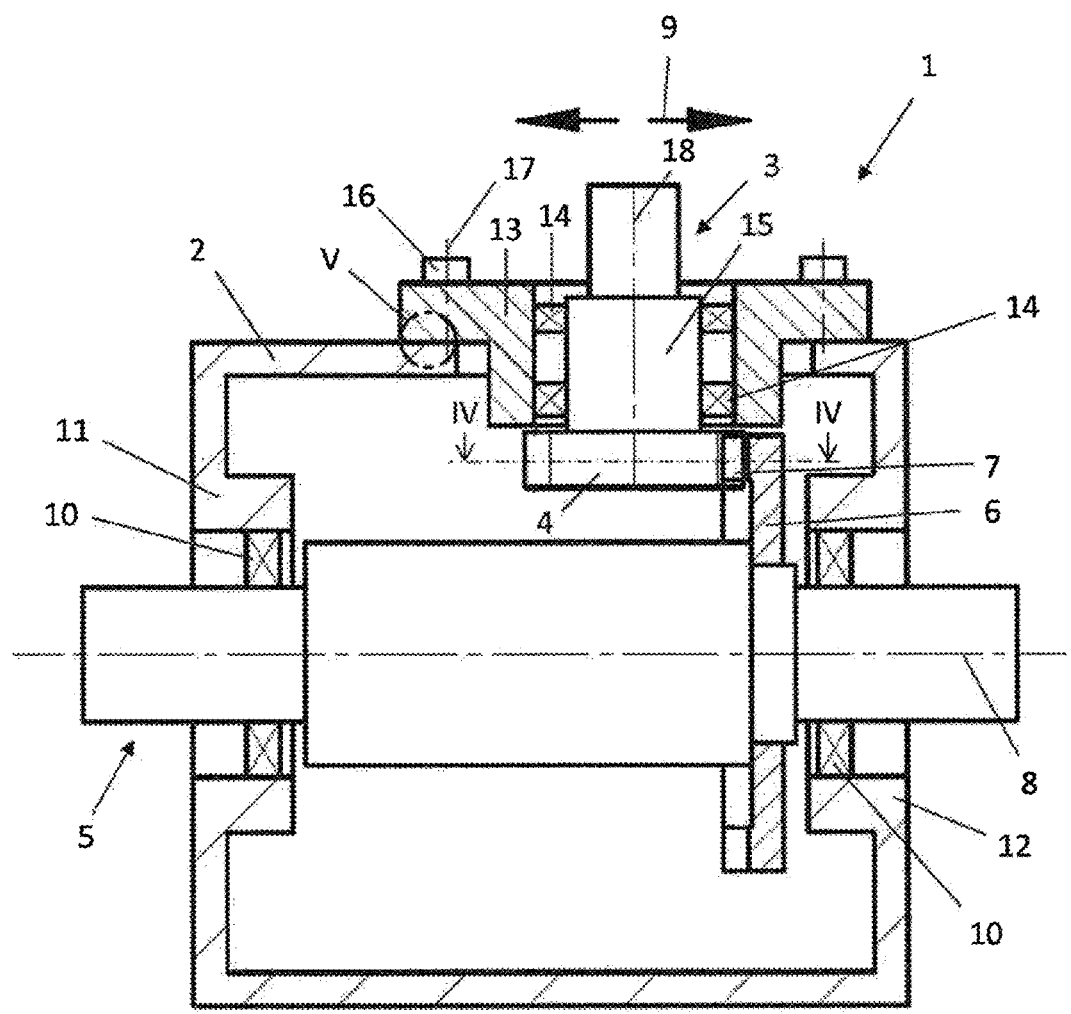
FIG. 3 shows a schematic sectional view of a crown wheel gear according to one embodiment of the invention.

FIG. 3 shows a schematic sectional view of a crown wheel gear 1 according to an embodiment of the invention. The crown wheel gear 1 has a housing 2, a pinion shaft 3 rotatably mounted relative to the housing 2, a pinion 4 connected to the pinion shaft 3, a crown wheel shaft 5 rotatably mounted relative to the housing 2, and a crown wheel 6 connected to the crown wheel shaft 5. The pinion 4 and the crown wheel 6 are in toothed engagement 7 with one another, i.e., the teeth of the pinion 4 and the teeth of the crown wheel 6 mesh.

The crown wheel 6 and the crown wheel shaft 5 are arranged rotatably but fixed in position relative to the housing 2. Accordingly, neither the crown wheel 6 nor the crown wheel shaft 5 changes the spatial position relative to the housing 2 during a rotation around the crown wheel shaft axis 8. The crown wheel 6 and the crown wheel shaft 5 do not change their position relative to the housing 2 in the radial direction in relation to the crown wheel shaft axis 8 nor the axial direction in relation to the crown wheel shaft axis 8. The pinion 4 is displaceable to adjust the pivoting flank play between the crown wheel 6 and the pinion 4.

The crown wheel shaft 5 is mounted by means of a bearing 10. The bearing 10 is arranged between the housing 2 and the crown wheel shaft 5. The bearing 10 can be a roller bearing or a plain bearing. The crown wheel shaft 5 protrudes on both sides out of the housing 2. Accordingly, the bearing 10 is arranged on a first side 11 of the housing 2 and on a second side 12 of the housing 2 between the crown wheel shaft 5 and the housing 2.

The pinion shaft 3 is rotatably mounted in a flange 13 by means of a bearing 14. The bearing 14 can be a roller bearing or a plain bearing. The bearing 14 determines how the pinion shaft 3 is mounted relative to the flange 13 in the axial and in the radial directions. The pinion shaft 3 protrudes with one end beyond the housing 2 and the flange 13. At the other end, the pinion shaft 3 protrudes in the other direction beyond the flange 13 and into the housing 2 and is connected to the pinion 4. The bearing 14 is arranged between the flange 13 and a bearing area 15 of the pinion shaft 3.

The flange 13 is detachably connected to the housing 2. The flange 13 therefore can be displaced relative to the housing 2 after the connection is detached. As shown in FIG. 3, the flange 13 is connected by means of lag screws 16 to the housing 2. The lag screws 16 can be aligned here so that the lag screw axes 17 of the lag screws 16 screwed into the housing 2 protrude perpendicularly to the surface of the housing 2.

The holes in the flange 13, through which the lag screws 16 are guided, can be oblong. Accordingly, the lag screws 16 are loosened somewhat to displace the flange 13. The flange 13 is displaced into the desired position with the lag screws 16 left in the oblong holes. The lag screws 16 are then tightened again so that the flange 13 is again firmly but detachably connected to the housing 2. Alternatively or additionally, multiple holes can also be provided in the housing 2 so that the flange 2 can be displaced in that it is fastened to the housing 2 by means of different holes in the housing 2.

In an alternative embodiment, the flange 13 can also be connected to the housing 2 by means of compression screws.

As FIG. 3 shows, the pinion 4 is displaceable parallel to the crown wheel shaft axis 8 by means of the flange 13. The pinion shaft 3 is furthermore mounted by means of the flange 13 such that the pinion shaft axis 18 is perpendicular to the crown wheel shaft axis 8.

In order for the pinion shaft axis 18 to be perpendicular to the crown wheel shaft axis 8, at least one longitudinal fit arranged parallel to the crown wheel shaft axis 8 can be arranged between the housing 2 and the flange 13. The longitudinal fit can have a groove in the housing 2, a groove in the flange 13, and a feather key arranged in the two groups.

Figure 4:
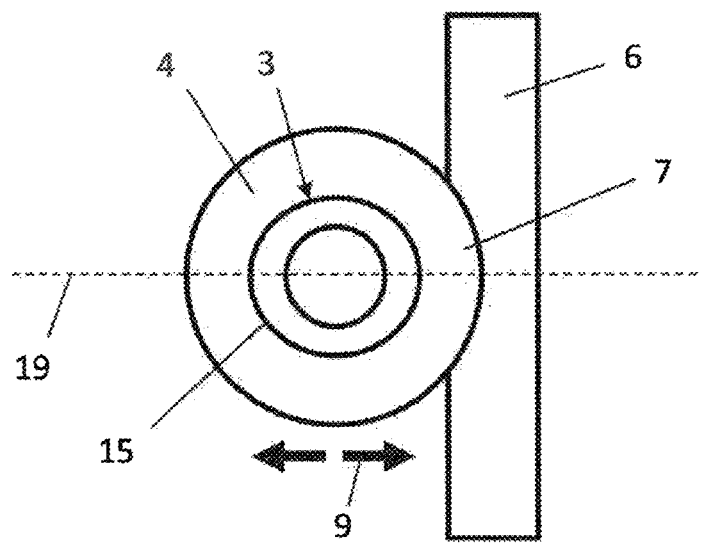
FIG. 4 shows a schematic sectional view along line IV-IV from FIG. 3.

FIG. 4 shows a schematic sectional view along line IV-IV from FIG. 3. The viewing direction corresponds to the direction of the arrows identified by IV. The pinion 4 and the crown wheel 6 are visible. In the overlap area of pinion 4 and crown wheel 6, the toothed engagement 7 occurs. The individual teeth of pinion 4 and crown wheel 6 are not shown in FIG. 4. Furthermore, the pinion shaft 3 having the bearing area 15 is shown. The arrows 9 show the direction in which the pinion 4 and the pinion shaft 3 are displaceable in order to adjust the pivoting flank play between the crown wheel 6 and the pinion 4. The displacement direction extends along the dashed line 19, which extends parallel to the crown wheel shaft axis 8.

Figure 5:
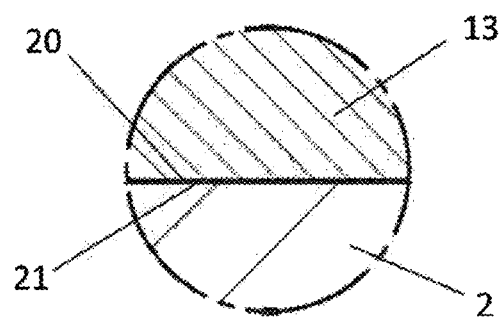
FIG. 5 shows an enlarged view of area V from FIG. 3.

FIG. 5 shows an enlarged view of area V from FIG. 3. As can be seen in FIG. 5, the flange 13 has a planar contact area 20 and the housing 2 has a planar contact area 21. Because both the contact area 20 and the contact area 21 are planar, the flange 13 is connected in a friction-locked manner to the housing 2 when the flange 13 is pressed by means of the lag screws 16 onto the housing 2.

Figure 6:
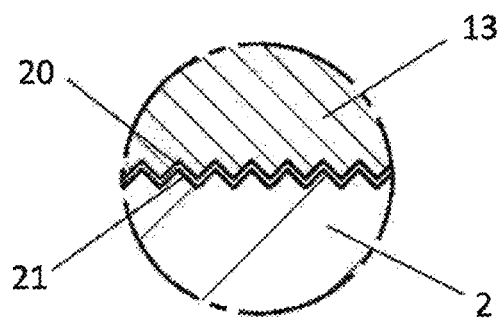
FIG. 6 shows a further alternative enlarged view of area V from FIG. 3.

FIG. 6 shows a further alternative enlarged view of area V from FIG. 3. As shown in FIG. 6, the contact area 20 of the flange 13 and the contact area 21 of the housing 2 have a jagged shape. Accordingly, the flange 13 and the housing 2 are connected via a partially formfitting connection when the flange 13 is pressed by means of the lag screws 16 onto the housing 2.

Alternatively, the contact area 20 of the flange 13 and the contact area 21 of the housing 2 can have a wavy shape. The flange 13 and the housing 2 are also connected via a partially formfitting connection in this case when the flange 13 is pressed by means of the lag screws 16 onto the housing 2.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A crown wheel gear (1), comprising
a housing (2);
a pinion shaft (3) rotatably mounted relative to the housing (2);
a pinion (4) connected to the pinion shaft (3);
a crown wheel shaft (5) rotatably mounted relative to the housing (2); and
a crown wheel (6) connected to the crown wheel shaft (5);
wherein the pinion (4) and the crown wheel (6) are in toothed engagement (7) with one another, and wherein the crown wheel shaft (5) has a crown wheel shaft axis (8);
the crown wheel (6) and the crown wheel shaft (5) being arranged rotatably but fixed in position relative to the housing (2), and the pinion (4) being displaceable relative to the crown wheel (6) in order to adjust a pivoting flank play between the crown wheel (6) and the pinion (4);
wherein the pinion (4) is displaceable parallel to the crown wheel shaft axis (8), wherein the pinion shaft (3) is rotatably mounted in a flange (13) and the flange (13) is arranged displaceably in relation to the housing (2), and wherein at least one longitudinal fit arranged parallel to the crown wheel shaft axis (8) is arranged between the housing (2) and the flange (13) in order to align the pinion shaft (3).

2. The crown wheel gear as claimed in claim 1, wherein the crown wheel shaft (5) has a crown wheel shaft axis (8) and the pinion (4) is displaceable parallel to the crown wheel shaft axis (8).

3. The crown wheel gear of claim 1, wherein the pinion shaft (3) includes a pinion shaft axis (18), and the pinion shaft (3) and the crown wheel shaft (5) are mounted to the housing (2) such that the pinion shaft axis (18) is arranged perpendicular to the crown wheel shaft axis (8).

4. The crown wheel gear of claim 1, wherein the flange (13) is connectable to the housing (2) by compression screws and/or lag screws (16).

5. The crown wheel gear of claim 1, wherein a contact area (20) of the flange (13) and a contact area (21) of the housing (2) are designed so that the flange (13) and the housing (2) are connectable via a friction-locked connection.

6. The crown wheel gear of claim 1, wherein a contact area (20) of the flange (13) and a contact area (21) of the housing (2) are designed so that the flange (13) and the housing (2) are connectable via a partially formfitting connection.

7. The crown wheel gear as of claim 6, wherein the contact area (20) of the flange (13) and/or the contact area (21) of the housing (2) has a jagged shape or a wavy shape.

8. The crown wheel gear of claim 1, wherein the longitudinal fit has a groove in the housing (2), a groove in the flange (13), and a feather key arranged in both grooves.

9. The crown wheel of claim 3, wherein the flange (13) is connectable to the housing (2) by compression screws and/or lag screws (16).

10. The crown wheel gear of claim 3, wherein a contact area (20) of the flange (13) and a contact area (21) of the housing (2) are designed so that the flange (13) and the housing (2) are connectable via a friction-locked connection.

11. The crown wheel gear of claim 4, wherein a contact area (20) of the flange (13) and a contact area (21) of the housing (2) are designed so that the flange (13) and the housing (2) are connectable via a friction-locked connection.

12. The crown wheel gear of claim 3, wherein a contact area (20) of the flange (13) and a contact area (21) of the housing (2) are designed so that the flange (13) and the housing (2) are connectable via a partially formfitting connection.

13. The crown wheel gear of claim 6, wherein the longitudinal fit has a groove in the housing (2), a groove in the flange (13), and a feather key arranged in both grooves.

14. The crown wheel gear of claim 3, wherein the longitudinal fit has a groove in the housing (2), a groove in the flange (13), and a feather key arranged in both grooves.

15. The crown wheel gear of claim 5, wherein the longitudinal fit has a groove in the housing (2), a groove in the flange (13), and a feather key arranged in both grooves.

* * * * *